US009600171B2

(12) United States Patent
Rhee et al.

(10) Patent No.: US 9,600,171 B2
(45) Date of Patent: Mar. 21, 2017

(54) INFORMATION DISPLAY DEVICE AND METHOD FOR THE SAME

(75) Inventors: Eunwha Rhee, Seoul (KR); Yongbong Choi, Seoul (KR); Soondong Park, Seoul (KR); Sanghyun Lee, Suwon-Si (KR); Jeonghwan Hwang, Seongnam-Si (KR)

(73) Assignee: LG ELECTRONICS INC., Seoul (KR)

(*) Notice: Subject to any disclaimer, the term of this patent is extended or adjusted under 35 U.S.C. 154(b) by 403 days.

(21) Appl. No.: 13/993,616

(22) PCT Filed: Dec. 19, 2011

(86) PCT No.: PCT/KR2011/009781
§ 371 (c)(1),
(2), (4) Date: Jun. 12, 2013

(87) PCT Pub. No.: WO2012/093784
PCT Pub. Date: Jul. 12, 2012

(65) Prior Publication Data
US 2013/0298024 A1 Nov. 7, 2013

(30) Foreign Application Priority Data

Jan. 4, 2011 (KR) .................... 10-2011-0000619

(51) Int. Cl.
*G06F 3/00* (2006.01)
*G06F 3/0488* (2013.01)
(Continued)

(52) U.S. Cl.
CPC .......... *G06F 3/0488* (2013.01); *G06F 3/0484* (2013.01); *G06F 3/0486* (2013.01);
(Continued)

(58) Field of Classification Search
CPC . G06F 3/0488; H04M 1/67; G02B 2027/0178
See application file for complete search history.

(56) References Cited

U.S. PATENT DOCUMENTS

2007/0150842 A1* 6/2007 Chaudhri et al. ............. 715/863
2009/0006991 A1 1/2009 Lindberg et al.
(Continued)

FOREIGN PATENT DOCUMENTS

| CN | 101625620 | 1/2010 |
|---|---|---|
| CN | 101882046 | 11/2010 |
| EP | 2144148 A2 | 1/2010 |
| WO | 2007/076210 | 7/2007 |

OTHER PUBLICATIONS

The State Intellectual Property Office of the People's Republic of China Application Serial No. 201180064163.0 Office Action dated Aug. 25, 2015, 17 pages.

(Continued)

*Primary Examiner* — Di Xiao
(74) *Attorney, Agent, or Firm* — Lee, Hong, Degerman, Kang & Waimey

(57) ABSTRACT

Disclosed are an information display device and a method for the same, which can unlock a touch screen quickly and effectively when the touch screen is in a locking state. The information display device comprises a display module including a touch screen; a controller displaying a lock image in the display module when the touch screen is in a locking state, and displaying a first icon indicating the locking state of the touch screen on the lock image, a first region for releasing the locking state of the touch screen on the lock image, and a second region indicating a second icon linked to an application program on the lock image.

16 Claims, 13 Drawing Sheets

(51) Int. Cl.
*G06F 21/31* (2013.01)
*G06F 21/36* (2013.01)
*H04M 1/67* (2006.01)
*G06F 3/0484* (2013.01)
*G06F 3/0486* (2013.01)
*H04W 12/06* (2009.01)
*H04W 88/02* (2009.01)
*G06F 3/0481* (2013.01)

(52) U.S. Cl.
CPC .............. *G06F 21/31* (2013.01); *G06F 21/36* (2013.01); *H04M 1/67* (2013.01); *G06F 3/04817* (2013.01); *G06F 3/04842* (2013.01); *G06F 3/04845* (2013.01); *G06F 2221/2147* (2013.01); *H04M 2250/22* (2013.01); *H04W 12/06* (2013.01); *H04W 88/02* (2013.01)

(56) References Cited

U.S. PATENT DOCUMENTS

| | | | |
|---|---|---|---|
| 2010/0060586 | A1 | 3/2010 | Pisula et al. |
| 2010/0212001 | A1* | 8/2010 | Kashyap et al. ................. 726/7 |
| 2010/0269040 | A1 | 10/2010 | Lee |
| 2010/0306718 | A1 | 12/2010 | Shim et al. |
| 2011/0163972 | A1* | 7/2011 | Anzures et al. ............. 345/173 |
| 2012/0084734 | A1* | 4/2012 | Wilairat ........................ 715/863 |

OTHER PUBLICATIONS

European Patent Office Application Serial No. 11854651.4, Search Report dated Jan. 11, 2016, 8 pages.

* cited by examiner

INFORMATION DISPLAY DEVICE AND METHOD FOR THE SAME

CROSS-REFERENCE TO RELATED APPLICATIONS

This application is the National Stage filing under 35 U.S.C. 371 of International Application No. PCT/KR2011/009781, filed on Dec. 19, 2011, which claims the benefit of earlier filing date and right of priority to Korean Patent Application No. 10-2011-0000619, filed on Jan. 4, 2011, the contents of which are all hereby incorporated by reference herein in their entirety.

TECHNICAL FIELD

The present invention relates to an information display device and a method for the same.

BACKGROUND ART

Generally, an information display device displays information selected by a user in a display module.

DISCLOSURE OF INVENTION

Solution to Problem

Therefore, an object of the present invention is to provide an information display device and a method for the same, which can unlock a touch screen quickly and effectively when the touch screen is in a locking state.

To achieve these and other advantages and in accordance with the purpose of the present invention, as embodied and broadly described herein, there is provided an information display device comprising a display module including a touch screen; a controller displaying a lock image in the display module when the touch screen is in a locking state, and displaying a first icon indicating the locking state of the touch screen on the lock image, a first region for releasing the locking state of the touch screen on the lock image, and a second region indicating a second icon linked to an application program on the lock image.

As an example of the present invention, the first icon may be an execution cursor for releasing the locking state of the touch screen.

As an example of the present invention, the controller may activate the first icon, the first region and the second region when the touch screen is in the locking state, and may display an icon indicating unlocking of the touch screen in the first region.

As an example of the present invention, the controller may display at least one or combination of an icon linked to an application program which is previously set, an icon linked to an application program automatically set in accordance with use frequency, and an icon linked to an application program recently used, in the second region.

As an example of the present invention, the controller may automatically unlock the touch screen when the first icon is located in the first region.

As an example of the present invention, the controller may display a window requesting a password in the display module when the first icon is located in the first region, and displays a desktop image in the display module when the password is input.

As an example of the present invention, the controller may display a second icon indicating that the touch screen has been unlocked when the first icon is located in the first region.

As an example of the present invention, the first region and the second region may respectively be curved lines each having a rim, and may be two regions generated by separating one circle having a rim.

As an example of the present invention, the controller may control the first icon to be shifted within the generated two regions only.

As an example of the present invention, the controller may execute the application program linked to the second icon when the first icon is located in the second icon of the second region in a state that the touch screen of the display module is in the locking state.

As an example of the present invention, the controller may unlock the touch screen and execute the application program linked to the second icon when the first icon is located in the second icon of the second region in a state that the touch screen of the display module is in the locking state.

As an example of the present invention, the controller may execute the application program linked to the second icon displayed in the second region when the first icon is located in the second region in a state that the touch screen of the display module is in the locking state.

As an example of the present invention, the controller may execute the application program linked to the second icon when the second icon is located in the first region in a state that the touch screen of the display module is in the locking state.

As an example of the present invention, the controller may unlock the touch screen and execute the application program linked to the second icon when the second icon is located in the first region in a state that the touch screen of the display module is in the locking state.

As an example of the present invention, the controller may display a key for controlling audio playback and/or audio information on the lock image when the touch screen is in the locking state and audio is being played back.

In another aspect of the present invention, there is provided a method for displaying information, which comprises the steps of displaying a lock image on a display module when a touch screen of the display module is in a locking state; and displaying a first icon indicating the locking state of the touch screen on the lock image, a first region for releasing the locking state of the touch screen on the lock image, and a second region indicating a second icon linked to an application program on the lock image.

BEST MODE FOR CARRYING OUT THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, an information display device and a method for the same, which can unlock a touch screen quickly and effectively when the touch screen is locked, will be described with reference to FIG. 1 to FIG. 13.

Figure 1:
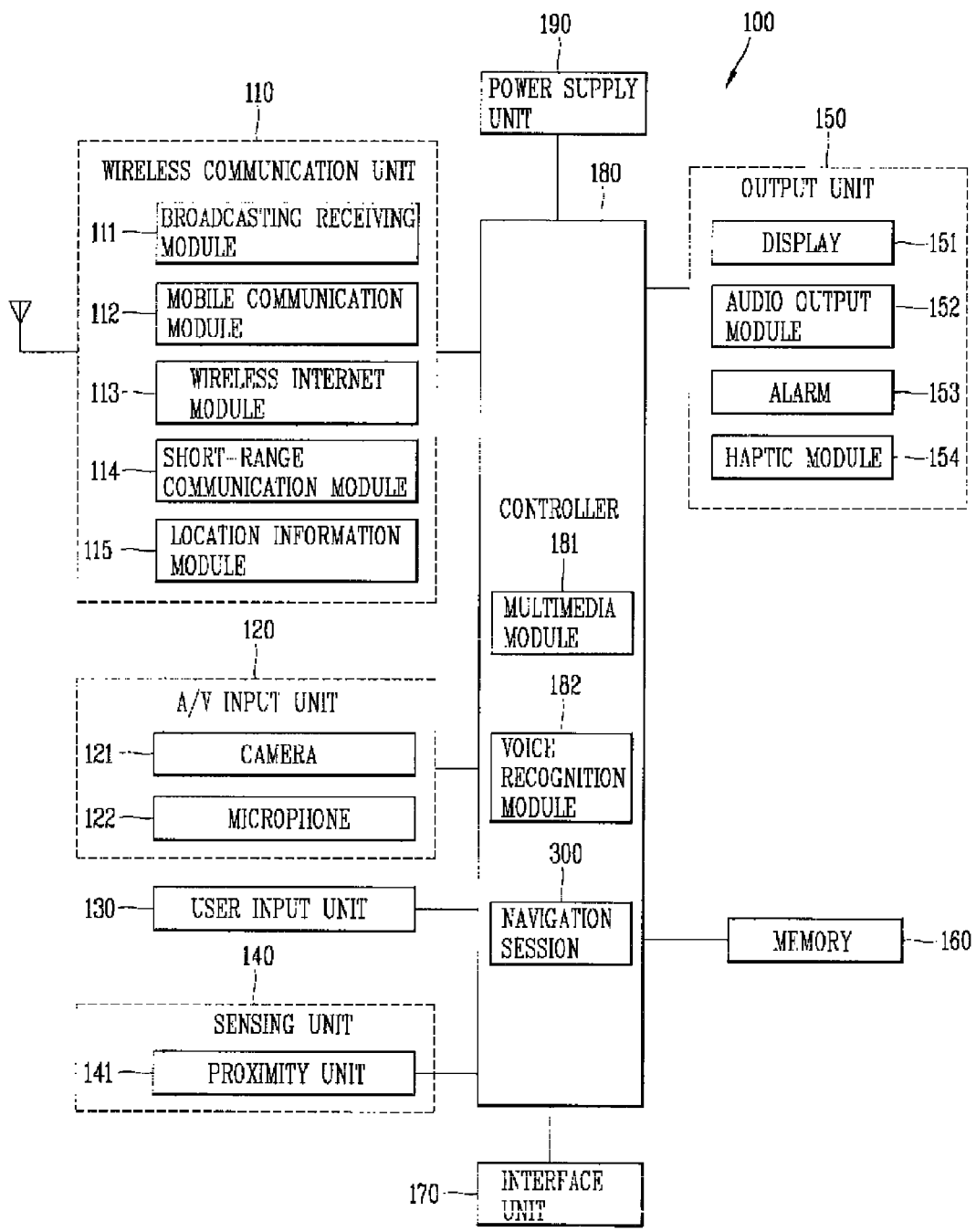
FIG. 1 is a schematic view illustrating a configuration of a mobile communication terminal to which an information display device according to the embodiments of the present invention is applied.

FIG. 1 is a schematic view illustrating a configuration of a mobile communication terminal 100 to which an information display device according to the embodiments of the present invention is applied. The mobile communication terminal (cellular phone) 100 may be implemented in various types. For example, examples of the mobile communication terminal 100 include a mobile phone, a smart phone, a notebook computer, a digital broadcast terminal, PDA (personal digital assistants), and a PMP (portable multimedia player).

As shown in FIG. 1, the mobile communication terminal 100 may include a wireless communication module 110, an A/V (audio/video) input module 120, a user input module 130, a sensing module 140, an output module 150, a memory module 160, an interface module 170, a controller 180, a power supply module 190 and the like. FIG. 1 shows the mobile communication terminal 100 having various components, but it is understood that all of the illustrated components are not requirements. The mobile communication terminal 100 may be implemented by greater or fewer components than the components illustrated in FIG. 1.

The wireless communication module 110 may include one or more components which permit wireless communication between the mobile communication terminal 100 and a wireless communication system or between the mobile communication terminal 100 and a network within which the mobile communication terminal 100 is located. For example, the wireless communication module 110 may include a broadcast receiving module 111, a mobile communication module 112, a wireless internet module 113, a short-range communication module 114, a position information module 115 and the like.

The broadcast receiving module 111 receives a broadcast signal and/or broadcast associated information from an external broadcast managing server via a broadcast channel. The broadcast channel may include a satellite channel and a terrestrial channel. The broadcast managing server may generally refer to a server which generates and transmits a broadcast signal and/or broadcast associated information or a server which is provided with a previously generated broadcast signal and/or broadcast associated information and then transmits the provided signal or information to the mobile communication terminal 100. The broadcast associated information may refer to information associated with a broadcast channel, a broadcast program, or a broadcast service provider. The broadcast signal may include a TV broadcast signal, a radio broadcast signal, and a data broadcast signal. If desired, the broadcast signal may further include a broadcast signal combined with a TV or radio broadcast signal.

In the meantime, the broadcast associated information may be provided via a mobile communication network. In this case, the broadcast associated information may be received by the mobile communication module 112. The broadcast associated information may exist in various forms. For example, the broadcast associated information may exist in a format of an electronic program guide (EPG) of digital multimedia broadcasting (DMB) or electronic service guide (ESG) of digital video broadcast-handheld (DVB-H).

The broadcast receiving module 111 may be configured to receive broadcast signals through various types of broadcast systems such as digital multimedia broadcasting-terrestrial (DMB-T), digital multimedia broadcasting-satellite (DMB-S), digital video broadcast-handheld (DVB-H), the data broadcasting system known as media forward link only (MediaFLO) and integrated services digital broadcast-terrestrial (ISDB-T). The broadcast receiving module 111 is configured to be suitable for other broadcast systems, which provide broadcast signals, as well as the aforementioned digital broadcast systems. The broadcast signal and/or broadcast associated information received by the broadcast receiving module 111 may be stored in the memory module 160.

The mobile communication module 112 transmits/receives wireless signals to/from at least one of a base station, an external terminal, a server on a mobile communication network. Such wireless signals may include audio call signals, video call signals, and/or various types of data based on text/multimedia message transmission and reception.

The wireless internet module 113 refers to a module for wireless Internet access. This module 113 may be internally or externally provided to the mobile communication terminal 100. In this case, WLAN (Wireless LAN) (Wi-Fi), Wibro (Wireless broadband), Wimax (World Interoperability for Microwave Access), HSDPA (High Speed Downlink Packet Access), etc. may be used for the wireless Internet technology.

The short-range communication module 114 refers to a module for short-range communications. Examples of the short-range communication technology may include Bluetooth, radio frequency identification (RFID), infrared data association (IrDA), ultra-wideband (UWB), ZigBee, etc.

The position information module 115 is a module for identifying or obtaining the position of the mobile communication terminal 100. An example of the position information module 115 includes a global positioning system (GPS) module. The GPS module receives position information from a plurality of satellites. In this case, the position information may include coordinate information displayed by latitude and longitude. For example, the GPS module may exactly calculate the current position information in accordance with triangulation by calculating exact distance information and time information from at least three satellites. In this case, distance and time information may be obtained from three satellites and an error may be corrected by one satellite. In particular, the GPS module may obtain exact time together with 3-dimensional speed information as well as longitude, latitude and altitude from the position information received from the satellites. A Wi-Fi positioning system and/or a hybrid positioning system may be used as the position information module 115.

The position information module 115 may further include an earth magnetic field sensor and/or a gravity sensor, which detects a direction. For example, the position information module 115 detects a direction (for example, east, west, southern and northern) of the mobile communication terminal to implement navigation based on augmented reality through the earth magnetic field sensor (electronic compass). The position information module 115 detects a direction on which gravity acts, through the gravity sensor (G sensor), displays a vertical screen when a user grips the mobile communication terminal longitudinally in a vertical direction and displays a wide screen by automatically rotating the screen 90 degree when the user grips the mobile communication terminal in a horizontal direction. Also, when the user watches moving pictures, the position information module 115 allows the user to conveniently watch the moving pictures by rotating the screen, through the gravity sensor, in accordance with a direction of the mobile communication terminal gripped by the user.

The audio/video (A/V) input module 120 is configured to input audio or video signal, and may include a camera 121 and a microphone 122. The camera 121 processes image frames of still pictures or moving pictures, which are obtained by an image sensor in a video call mode or a photographing mode. And, the processed image frames may be displayed in the display module 151.

The image frames processed by the camera 121 may be stored in the memory module 160 or may be externally transmitted via the wireless communication module 110. Optionally, at least two cameras 121 may be provided to the mobile communication terminal 100 in accordance with a configuration type of the mobile communication terminal 100.

The microphone 122 receives an external audio signal in a phone call mode, recording mode or voice recognition mode, and processes and converts the audio signal into electric audio data. The processed audio data is transformed into a format transmittable to a mobile communication base station via the mobile communication module 112 in case of the call mode. The microphone 122 may include various noise removing algorithms to remove noise generated in the course of receiving the external audio signal.

The user input module 130 generates input data for allowing the user to control the operation of the mobile communication terminal. The user input module 130 may include a keypad, a dome switch, a touchpad (e.g., static pressure/capacitance), a jog wheel, a jog switch, etc. In particular, if the touch pad has a mutual layer structure with the display module 151, it may be referred to as a touch screen.

The sensing module 140 generates sensing signals for controlling the operation of the mobile communication terminal 100 by sensing the current status of the mobile communication terminal 110, such as an open/close status of the mobile communication terminal 100, the location of the mobile communication terminal 100, the presence or absence of user contact with the mobile communication terminal 100, orientation of the mobile communication terminal 100, and acceleration/deceleration of the mobile communication terminal 100. As an example, consider the mobile communication terminal 100 being configured as a slide-type mobile communication terminal. In this configuration, the sensing module 140 may sense whether a sliding portion of the mobile communication terminal is open or closed. Also, the sensing module 140 may serve to sense the presence or absence of power supply of the power supply module 190, the presence or absence of a coupling or other connection between the interface module 170 and an external device.

The interface module 170 serves to interface with all the external devices connected with the mobile communication terminal 100. For example, the interface module 170 may include a wired/wireless headset port, an external charger port, a wired/wireless data port, a memory card port, a port for coupling to a device having an identity module, audio input/output (I/O) ports, video input/output (I/O) ports, an earphone port and/or the like. In this case, the identity module is the chip for storing various kinds of information for authenticating a use authority of the mobile communication terminal 100, and may include a User Identify Module (UIM), a Subscriber Identify Module (SIM), a Universal Subscriber Identity Module (USIM) and/or the like. Also, a device having the identity module (hereinafter, referred to as 'identity device' may be manufactured in a type of a smart card. Therefore, the identity module may be connected with the mobile communication terminal 100 through the corresponding port. The interface module 170 described as above receives data from the external devices or is supplied with the power and then transfers the data or power to the respective elements of the mobile communication terminal 100 or enables data within the mobile communication terminal 100 to be transferred to the external devices.

The output module 150 is for the output of audio signals, video signals or alarm signals, and may include the display module 151, an audio output module 152, and an alarm module 153.

The display module 151 displays and outputs information processed by the mobile communication terminal 100. For example, if the mobile communication terminal 100 is operating in a phone call mode, the display module 151 displays a user interface (UI) or graphical user interface (GUI) associated with the phone call mode. If the mobile communication terminal 100 is in a video call mode or a photographing mode, the display module 151 may additionally or alternatively display images which are associated with the photographing mode and/or the video call mode, the UI or the GUI.

The display module 151 may include at least one of a liquid crystal display (LCD), a thin film transistor-liquid crystal display (TFT-LCD), an organic light-emitting diode display (OLED), a flexible display and a three-dimensional display (3D display). The mobile communication terminal 100 may include two or more display modules 151 in accordance with its implemented configuration. For example, the mobile communication terminal 100 may be provided with an external display module (not shown) and an internal display module (not shown) at the same time.

In case that the display module 151 and a sensor for detecting a touch action (hereinafter, referred to as 'touch sensor') configure a mutual layer structure (hereinafter, referred to as 'touch screen'), the display module 151 may be used as an input device as well as an output device. In this case, the touch sensor may be configured as a touch film, a touch sheet, a touch pad or the like.

Also, the touch sensor may be configured to convert a pressure applied to a specific portion of the display module 151 or a variation of a capacitance generated from a specific portion of the display module 151 into an electric input signal. Moreover, the touch sensor may be configured to detect a pressure of a touch as well as a touched position or area. If a touch input is made to the touch sensor, signal(s) corresponding to the touch is transferred to a touch controller (not shown). The touch controller processes the signal(s) and then transfers the processed signal(s) to the controller 180. Therefore, the controller 180 is able to know which portion of the display module 151 is touched.

In the present invention, proximity-touch means that a pointer is not actually touched to the screen but touched by being spaced apart from the screen at a predetermined distance.

The proximity sensor 141 may be arranged in an internal area of the mobile communication terminal 100 enclosed by the touch screen or near the touch screen. The proximity sensor 141 is the sensor that detects the presence or non-presence of an object approaching a predetermined detecting surface or an object existing near the proximity sensor by using an electromagnetic field strength or infrared ray without mechanical contact. The proximity sensor 141 has durability longer than that of a contact type sensor and also has utility wider than that of the contact type sensor.

Examples of the proximity sensor may include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touch screen includes the electrostatic capacity proximity sensor, it is configured to detect the proximity of the pointer using a variation of electric field based on the proximity of the pointer. In this case, the touch screen (touch sensor) may be classified as the proximity sensor.

In the following description, for convenience of description, an action that the pointer is recognized to be located on the touch screen near the touch screen without contacting with the touch screen will be referred to as 'a proximity touch'). And, an action that the pointer actually touches the touch screen will be referred to as 'contact touch'. The location on the touch screen proximity-touched by the pointer means the location of the pointer which vertically opposes the touch screen when the pointer performs the proximity touch.

Also, the proximity sensor 141 detects a proximity touch and a proximity touch pattern (e.g., a proximity touch distance, a proximity touch direction, a proximity touch speed, a proximity touch time, a proximity touch location, a proximity touch shift state, etc.). And, information corresponding to the detected proximity touch action and the detected proximity touch pattern may be output on the touch screen.

The sensing module 140 may include an acceleration sensor 142. The acceleration sensor 142 is a device that converts acceleration variation in one direction into an electric signal, and is widely used in accordance with the development of the microelectromechanical systems (MEMS) technology. The acceleration sensor 142 may include various kinds of sensors, for example, an acceleration sensor, which is built in an airbag system of a car and measures acceleration of a great value to sense collision, and an acceleration sensor, which measures acceleration of a fine value for use in an input means of games, etc. by recognizing fine action of hands of a user. The acceleration sensor 142 is generally configured to mount two axes or three axes in one package, and may need only one axis of Z axis depending on a usage condition. Accordingly, if the acceleration sensor of X axis or Y axis instead of Z axis should be used for some reason, a separate fragment board may be used, whereby the acceleration sensor may uprightly be mounted in a main board.

The audio output module 152 outputs audio data received from the wireless communication module 110 or stored in the memory module 160 in various modes including a call-receiving mode, a call mode, a recording mode, a voice recognition mode, a broadcast reception mode and the like. Also, the audio output module 152 outputs an audio signal related to a function (for example, call signal receiving audio, message receiving audio, etc.) performed by the mobile communication terminal 100. The audio output module 152 may include a speaker and a buzzer.

The alarm module 153 outputs a signal for announcing the occurrence of an event in the mobile communication terminal 100. Examples of the event generated by the mobile communication terminal 100 may include a call received event, a message received event and a key signal input event. The alarm module 153 may output a signal for announcing the event occurrence by way of other types such as vibration as well as video or audio signal. When the call signal or the message is received, to notify the mobile communication terminal 100 of this received call signal or message, the alarm module 153 may vibrate the mobile communication terminal 100 through the vibration means. Alternatively, if a key signal is input, the alarm module 153 may vibrate the mobile communication terminal 100 through the vibration means as a feedback responsive to the key input signal. The user may recognize the event occurrence through the vibration. The signal for announcing the event occurrence may be output through the display module 151 or the audio output module 152.

A haptic module 154 generates various tactile effects that can be sensed by a user. Vibration is a representative one of the tactile effects generated by the haptic module 154. Strength and pattern of the vibration generated by the haptic module 154 are controllable. For example, different vibrations may be outputted in a manner of being synthesized together or may be output in sequence.

The haptic module 154 may generate various tactile effects as well as the vibration. For example, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 may be implemented to enable a user to sense the tactile effect through a muscle sense of finger, arm or the like as well as to transfer the tactile effect through a direct contact. Optionally, at least two haptic modules 154 may be provided to the mobile communication terminal 100 in accordance with the corresponding configuration type of the telematics mobile terminal. The haptic module 154 may be provided at a place frequently contacting with the user in a vehicle. For example, the haptic module 154 may be provided at a steering wheel, a gearshift lever, seat, and the like.

The memory module 160 may generally be used to store various types of programs for processing and control of the controller 180, or may temporarily store input/output data (for example, map data, phonebook data, messages, still pictures, moving pictures, etc.).

The memory module 160 may include at least one type of memory of a flash memory type, a hard disk type, multimedia card micro type, a card-type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disk. Also, the mobile communication terminal 100 may mange a web storage for performing a storage function of the memory module 160 on Internet.

The interface module 170 serves to interface with all the external devices connected with the mobile communication terminal 100. For example, the interface module 170 may include a wired/wireless headset port, an external charger port, a wired/wireless data port, a memory card port, a port for coupling to a device having an identity module, audio input/output (I/O) ports, video input/output (I/O) ports, an earphone port and/or the like. In this case, the identity module is the chip for storing various kinds of information for authenticating a use authority of the mobile communication terminal 100, and may include a User Identify Module (UIM), a Subscriber Identify Module (SIM), a Universal Subscriber Identity Module (USIM) and/or the like. Also, a device having the identity module (hereinafter, referred to as 'identity device') may be manufactured in a type of a smart card. Therefore, the identity module may be connected with the mobile communication terminal 100 through the corresponding port. The interface module 170 described as above receives data from the external devices or is supplied with the power and then transfers the data or power to the respective elements of the mobile communication terminal 100 or enables data within the mobile communication terminal 100 to be transferred to the external devices.

When the mobile communication terminal 110 is connected to an external cradle, the interface module 170 becomes a passage for supplying the mobile communication terminal 100 with a power from the cradle or a passage for delivering various command signals input from the cradle by a user to the mobile communication terminal 100. Each of the various command signals input from the cradle or the power may be operated as a signal enabling the user to recognize that the mobile communication terminal 100 has been exactly loaded in the cradle.

The controller 180 typically controls the overall operations of the mobile communication terminal 100. For example, the controller 180 performs the control and processing associated with voice calls, data communications, video calls, etc. The controller 180 may include a multimedia module 181 that provides multimedia playback. The multimedia module 181 may be configured as a part of the controller 180, or may be implemented separately from the controller 180.

Moreover, the controller 180 may perform a pattern recognizing process for recognizing a writing input and a picture drawing input carried out on the touch screen as characters or images, respectively.

The power supply module 190 provides the power required by the various components for the mobile communication terminal 100 by receiving the external power and the internal power under the control of the controller 180.

Functions of the various components applied to the mobile communication terminal 100 may be implemented in a computer-readable medium using, for example, computer software, hardware, or some combination thereof. For a hardware implementation, the functions may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and other electronic units designed to perform the functions described herein. Such embodiments may also be implemented by the controller 180. For a software implementation, the embodiments such as procedures or functions described herein may be implemented with separate software modules, each of which performs one or more of the functions and operations. The software codes may be implemented with a software application written in any suitable programming language. Also, the software codes may be stored in the memory module 160, and may be executed by the controller 180.

The voice recognition module 182 recognizes a voice uttered by a user, and performs a relevant function based on the recognized voice signal.

A navigation session 300 applied to the mobile communication terminal 100 displays a travel path on map data.

In the mean time, the information display device applied to the mobile communication terminal 100 according to embodiments of the present invention may include a display module, which includes a touch screen (for example, touch sensor), and a controller displaying a touch screen locking screen in the display module when the touch screen of the display module is in a locking state, and displaying a first icon (execution cursor) indicating the locking state of the touch screen on the touch screen locking screen, a first region for releasing the locking state of the touch screen on the touch screen locking screen, and a second region indicating icon(s) (representative image or thumbnail image) linked to an application program on the touch screen locking screen. The first icon may be an execution cursor for releasing the locking state of the touch screen.

The application program may be downloaded from a server (not shown) by the user. The application program may be a variety of application programs, such as a game program, an entertainment program, an educational program, a message management program, a calendar management program, a moving picture execution program, a photo display program, a weather information providing program, and the like, and those programs are stored in the memory module.

The touch sensor may be configured to detect a touch pressure as well as a touched position and a touched area.

The controller may activate the first icon, the first region and the second region when the touch screen of the display module is in a locking state, display an icon indicating unlocking of the touch screen in the first region, and display at least one or combination of icon(s) linked to an application program previously set by the user, icon(s) linked to an application program automatically set in accordance with use frequency, and icon(s) linked to an application program recently used, in the second region.

The controller automatically unlocks the touch screen when the first icon is located in the first region. For example, the controller unlocks the touch screen through drag and drop when the first icon is located in the first region.

The controller may display a window requesting a password in the display module when the first icon is located in the first region, and may display a desktop image in the display module when the password is input.

The controller may display a second icon, which indicates that the touch screen has been unlocked, in the first region when the first icon is located in the first region.

Each of the first region (or first execution region) and the second region (or second execution region) may be a curved line having a rim. The first region (or first execution region) and the second region (or second execution region) may be two regions (two separate circles each having a rim) generated by separating one circle having a rim into two.

The controller may control the first icon to be shifted within the first region and the second region only.

The detailed description of the configuration elements of the information display device applied to the mobile communication terminal 100 according to the embodiments of the present invention will be made with reference to FIG. 3 to FIG. 13.

Hereinafter, a configuration of a telematics mobile terminal 200 to which the information display device according to the embodiments of the present invention will be described with reference to FIG. 2.

Figure 2:
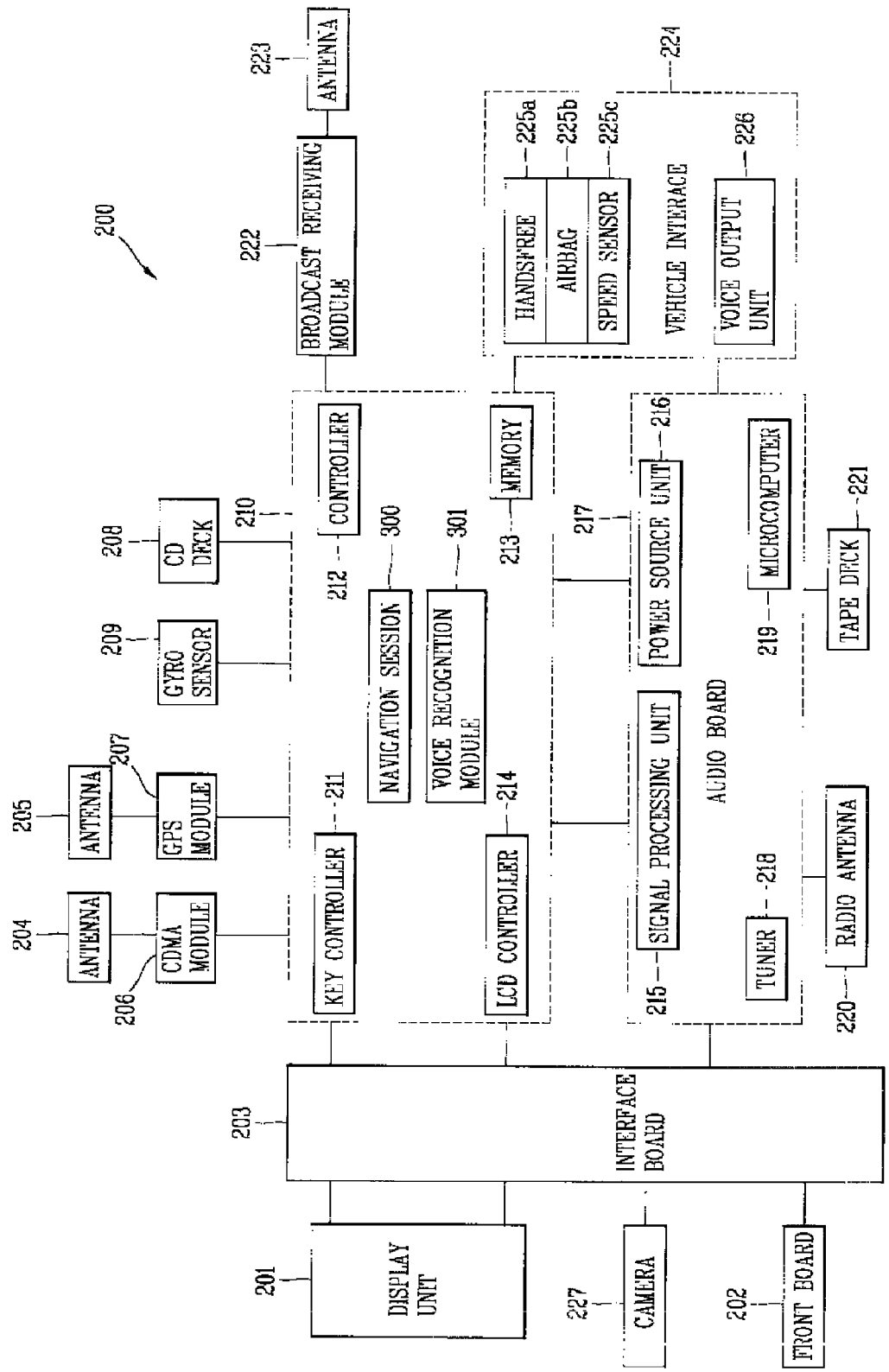
FIG. 2 is a schematic view illustrating a configuration of a telematics mobile terminal to which an information display device according to the embodiments of the present invention is applied.

FIG. 2 is a schematic view illustrating a configuration of a telematics mobile terminal to which an information display device according to the embodiments of the present invention is applied.

As shown in FIG. 2, the telematics mobile terminal 200 includes a controller (for example, central processing unit CPU) 212 controlling the telematics mobile terminal 200, a memory 213 storing various kinds of information, a key controller 211 controlling various kinds of key signals, and a main board 210 having an LCD controller 214 controlling a liquid crystal display (LCD).

The memory 213 stores map information (map data) for displaying load guide information on a map. Also, the memory 213 stores a traffic information collection control algorithm for allowing a user to input traffic information based on a status of load where a vehicle currently travels, and information for control of the above algorithm.

The main board 210 includes a code division multiple access (CDMA) module 206, which is a mobile communication terminal having a unique machine number and built in a vehicle, a global positioning system (GPS) module 207 guiding a location of the vehicle and receiving a GPS signal for tracing a travel path from a starting place to a destination or transmitting traffic information collected by the user as the GPS signal, a compact disk (CD) deck 208 for playing back a signal recorded in a CD, and a gyro sensor 209. The CDMA module 206 and the GPS module 207 transmit and receive a signal to and from each other through antennas 204 and 205.

Also, a broadcast receiving module 222 is connected to the main board 210, and receives a broadcast signal through an antenna 223. The main board 210 is connected with a display module (LCD) 201 controlled by the LCD controller 214, a front board 202 controlled by the key controller 211 and a camera 227 taking the inside and/or the outside of the vehicle through an interface board 203. The display module 201 displays various kinds of video signals and text signals, and the front board 202 includes a button for inputting various key signals and provides a key signal corresponding to a button selected by the user to the main board 210. Also, the display module 201 includes a proximity sensor and a touch sensor (touch screen) of FIG. 2.

The front board 202 includes a menu key for directly inputting traffic information, wherein the menu key may be configured to be controlled by the key controller 211.

The audio board 217 is connected with the main board 210, and processes various kinds of audio signals. The audio board 217 includes a microcomputer 219 for controlling the audio board 217, a tuner 218 receiving a radio signal, a power supply module 216 supplying the power to the microcomputer 219, and a signal processor 215 processing various kinds of audio signals.

Also, the audio board 217 includes a radio antenna 220 for receiving a radio signal and a tape deck 221 for playing back an audio tape. The audio board 217 may further include an audio output module (for example, amplifier) 226 for outputting the signal-processed audio signal.

The audio output module (amplifier) 226 is connected with a vehicle interface 224. In other words, the audio board 217 and the main board 210 are connected with the vehicle interface 224. The vehicle interface 224 may be connected with a handsfree 225a inputting an audio signal, an airbag 225b for safety of a passenger, and a speed sensor 225c for detecting a speed of the vehicle. The speed sensor 225c calculates a vehicle speed and provides the calculated vehicle speed information to the central processing unit 212.

A navigation session 300 applied to the telematics mobile terminal 220 generates load guide information on the basis of map data and vehicle current position information and reports the generated load guide information to the user.

The display module 201 senses a proximity touch within a display window through the proximity sensor. For example, the display module 201 detects a location of the proximity touch when a pointer (for example, finger or stylus pen) is proximity-touched, and outputs position information corresponding to the detected location to the controller 212.

A voice recognition unit (or voice recognition module) 301 recognizes voice uttered by the user and performs a corresponding function in accordance with the recognized voice signal.

The navigation session 300 applied to the telematics mobile terminal 200 displays a current location and a travel path on the map data.

In the mean time, the information display device applied to the telematics mobile terminal 200 according to embodiments of the present invention may include a display module, which includes a touch screen (for example, touch sensor), and a controller displaying a touch screen locking screen in the display module when the touch screen of the display module is in a locking state, and displaying a first icon (execution cursor) indicating the locking state of the touch screen on the touch screen locking screen, a first region for releasing the locking state of the touch screen on the touch screen locking screen, and a second region indicating icon(s) (representative image or thumbnail image)

linked to an application program on the touch screen locking screen. The first icon may be an execution cursor for releasing the locking state of the touch screen.

The application program may be downloaded from a server (not shown) by the user. The application program may be a variety of application programs, such as a game program, an entertainment program, an educational program, a message management program, a calendar management program, a moving picture execution program, a photo display program, a weather information providing program, and the like, and those programs are stored in the memory module.

The touch sensor may be configured to detect a touch pressure as well as a touched position and a touched area.

The controller may activate the first icon, the first region and the second region when the touch screen of the display module is in a locking state, display an icon indicating unlocking of the touch screen in the first region, and display at least one or combination of icon(s) linked to an application program previously set by the user, icon(s) linked to an application program automatically set in accordance with use frequency, and icon(s) linked to an application program recently used, in the second region.

The controller automatically unlocks the touch screen when the first icon is located in the first region. For example, the controller unlocks the touch screen through drag and drop when the first icon is located in the first region.

The controller may display a window requesting a password in the display module when the first icon is located in the first region, and may display a desktop image in the display module when the password is input.

The controller may display a second icon, which indicates that the touch screen has been unlocked, in the first region when the first icon is located in the first region.

Each of the first region (or first execution region) and the second region (or second execution region) may be a curved line having a rim. The first region (or first execution region) and the second region (or second execution region) may be two regions (two separate circles each having a rim) generated by separating one circle having a rim into two.

The controller may control the first icon to be shifted within the first region and the second region only.

The detailed description of the configuration elements of the information display device applied to the telematics mobile terminal 200 according to the embodiments of the present invention will be made with reference to FIG. 3 to FIG. 13.

Hereinafter, the information display device and a method for the same according to the first embodiment of the present invention will be described with reference to FIG. 3 to FIG. 7. The information display device and the method for the same according to the first embodiment of the present invention may be applied to a smart phone, a notebook computer, a digital broadcast terminal, PDA (personal digital assistants), a PMP (portable multimedia player), a desktop computer, a television, and various moving picture players as well as the mobile communication terminal 100, the telematics mobile terminal 200, and a video conference terminal.

Figure 3:
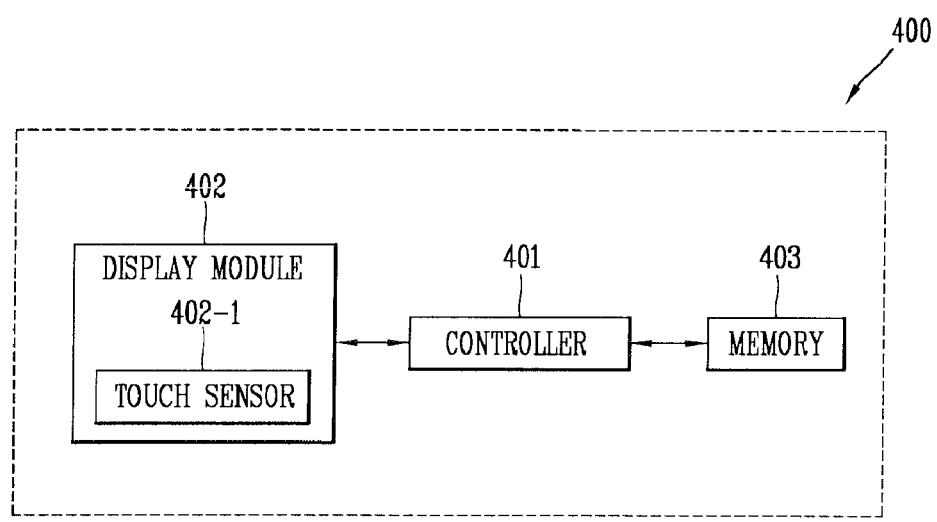
FIG. 3 is a schematic view illustrating an information display device according to the first embodiment of the present invention.

FIG. 3 is a schematic view illustrating an information display device according to the first embodiment of the present invention.

As shown in FIG. 1, the information display device 400 according to the first embodiment of the present invention may include a display module 402, which includes a touch screen (for example, touch sensor 402-1), and a controller 401 displaying a touch screen locking screen (e.g., lock screen, lock image and lock screen image) in the display module 402 when the touch screen of the display module is in a locking state (e.g., the mobile terminal is in a locking state), and displaying a first icon (execution cursor) indicating the locking state of the touch screen on the touch screen locking screen, a first region for releasing the locking state of the touch screen on the touch screen locking screen, and a second region indicating icon(s) (representative image or thumbnail image) linked to an application program on the touch screen locking screen. The first icon may be an execution cursor for releasing the locking state of the touch screen.

The application program may be downloaded from a server (not shown) by the user. The application program may be a variety of application programs, such as a game program, an entertainment program, an educational program, a message management program, a calendar management program, a moving picture execution program, a photo display program, a weather information providing program, and the like, and those programs are stored in a memory 403.

The touch sensor 402-1 may be configured to detect a touch pressure as well as a touched position and a touched area.

The controller 401 may activate the first icon, the first region and the second region when the touch screen of the display module is in a locking state, display an icon indicating unlocking of the touch screen in the first region, and display at least one or combination of icon(s) linked to an application program previously set by the user, icon(s) linked to an application program automatically set in accordance with use frequency, and icon(s) linked to an application program recently used, in the second region.

The controller 401 automatically unlocks the touch screen when the first icon is located in the first region. For example, the controller 401 unlocks the touch screen through drag and drop when the first icon is located in the first region.

The controller 401 may display a window requesting a password in the display module 402 when the first icon is located in the first region, and may display a desktop image in the display module 402 when the password is input.

The controller 401 may display a second icon, which indicates that the touch screen has been unlocked, in the first region when the first icon is located in the first region.

Each of the first region (or first execution region) and the second region (or second execution region) may be a curved line having a rim. The first region (or first execution region) and the second region (or second execution region) may be two regions (two separate circles each having a rim) generated by separating one circle having a rim into two.

The controller 401 may control the first icon to be shifted within the first region and the second region only.

Hereinafter, a method for displaying information according to the first embodiment of the present invention will be described with reference to FIG. 3 to FIG. 7.

Figure 4:
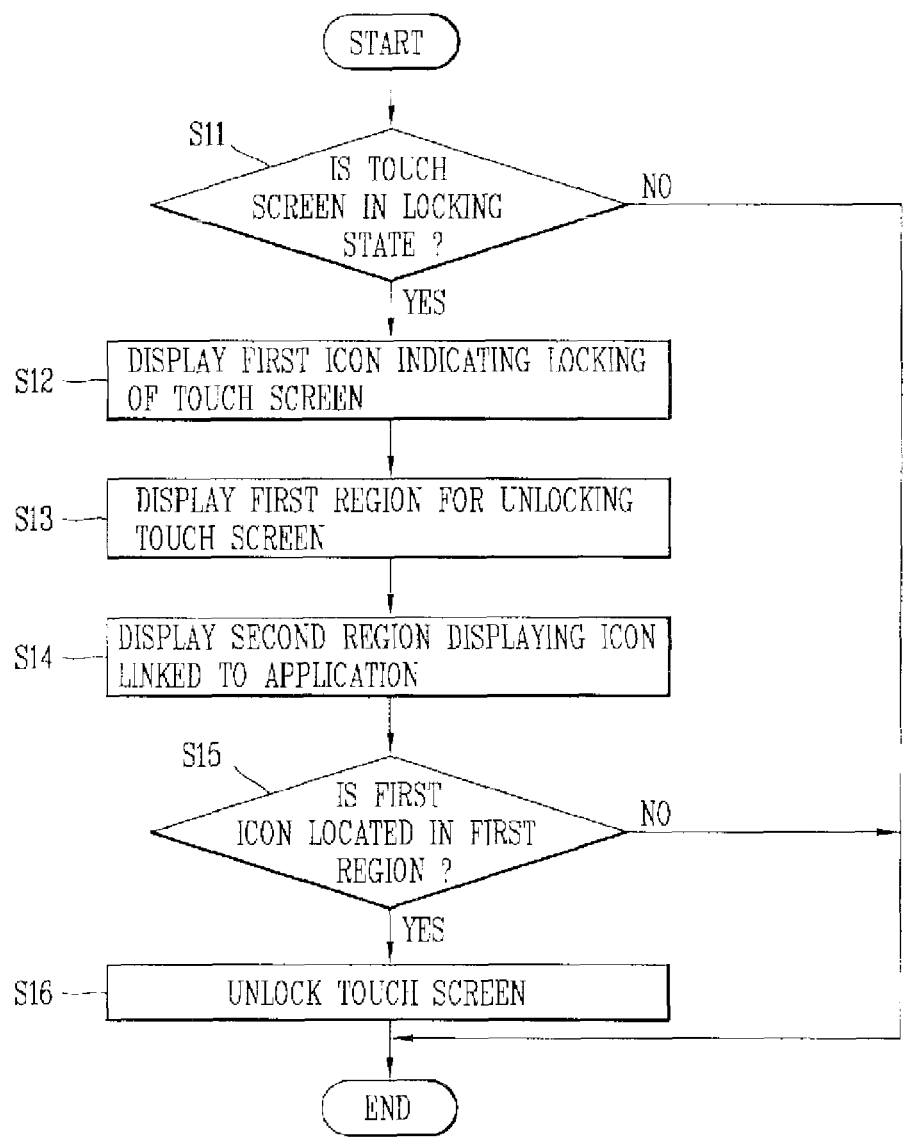
FIG. 4 is a flow chart illustrating a method for displaying information according to the first embodiment of the present invention.

FIG. 4 is a flow chart illustrating a method for displaying information according to the first embodiment of the present invention.

First of all, the controller 401 determines whether the touch screen of the display module 402 (or touch screen display module) is in a locking state (touch screen locking mode) (S11).

The controller 401 displays the touch screen locking screen (e.g., lock screen, lock image and lock screen image) on the display module 402 when the touch screen of the display module 402 (or touch screen display module) is in a locking state (touch screen locking mode).

The controller 401 generates a first icon (execution cursor) indicating the locking state of the touch screen and displays the generated first icon on the touch screen locking screen (S12).

The controller 401 displays a first region for unlocking the touch screen on the touch screen locking screen (S13).

The controller 401 displays a second region indicating icon(s) linked to an application program on the touch screen locking screen (S14). The controller 401 may simultaneously display the first icon, the first region and the second region on the touch screen locking screen when the touch screen is in a locking state.

Figure 5:
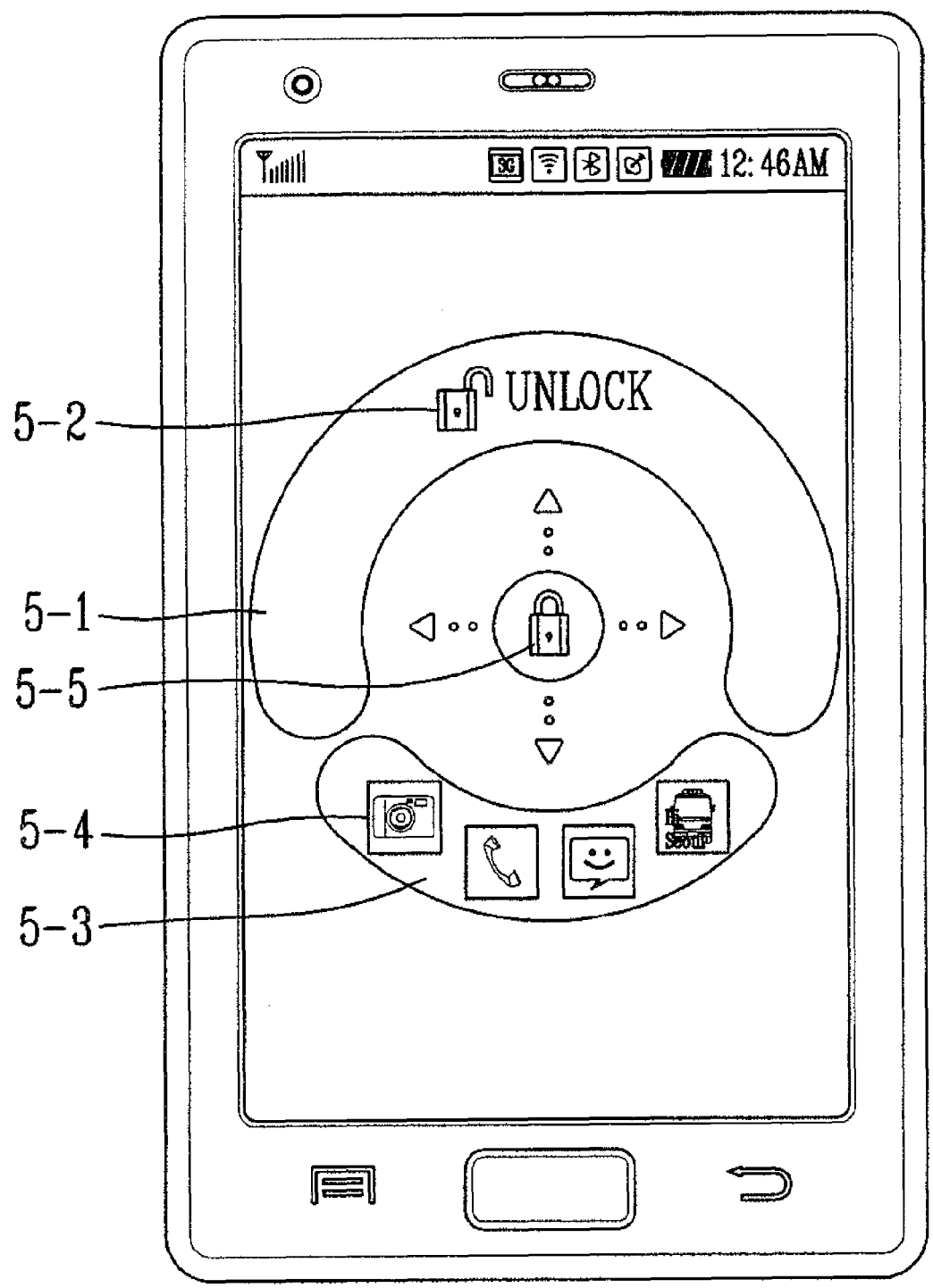
FIG. 5 is a diagram illustrating information displayed on a touch screen locking screen (lock image) in accordance with the first embodiment of the present invention.

FIG. 5 is a diagram illustrating information displayed on a touch screen locking screen in accordance with the first embodiment of the present invention.

As shown in FIG. 5, the controller 401 may simultaneously display the first icon (execution cursor) 5-5, a first region 5-1 and a second region 5-3 on the touch screen locking screen when the touch screen is in the locking state. The controller 401 may display an icon 5-2, which indicates that the touch screen could be unlocked, on the first region 5-1. The controller 401 may display icon(s) 5-4 linked to an application program on the second region 5-3. Each of the first region (or first execution region) 5-1 and the second region (or second execution region) 5-3 may be a curved line having a rim. The first region (or first execution region) 5-1 and the second region (or second execution region) 5-3 may be two regions 5-1 and 5-3 (two separate circles each having a rim) generated by separating one circle having a rim into two. The controller 401 may control the first icon 5-5 to be shifted within the first region 5-1 and the second region 5-3 only.

The application program may be downloaded from a server (not shown) by the user. The application program may be a variety of application programs, such as a game program, an entertainment program, an educational program, a message management program, a calendar management program, a moving picture execution program, a photo display program, a weather information providing program, and the like, and those programs are stored in a memory 403.

The controller 401 may activate the first icon, the first region and the second region when the touch screen of the display module 402 is in a locking state, display an icon indicating unlocking of the touch screen in the first region, and display at least one or combination of icon(s) linked to an application program previously set by the user, icon(s) linked to an application program automatically set in accordance with use frequency, and icon(s) linked to an application program recently used, in the second region.

The controller 401 determines whether the first icon 5-5 has been located in the first region 5-1 (S15).

Figure 6:
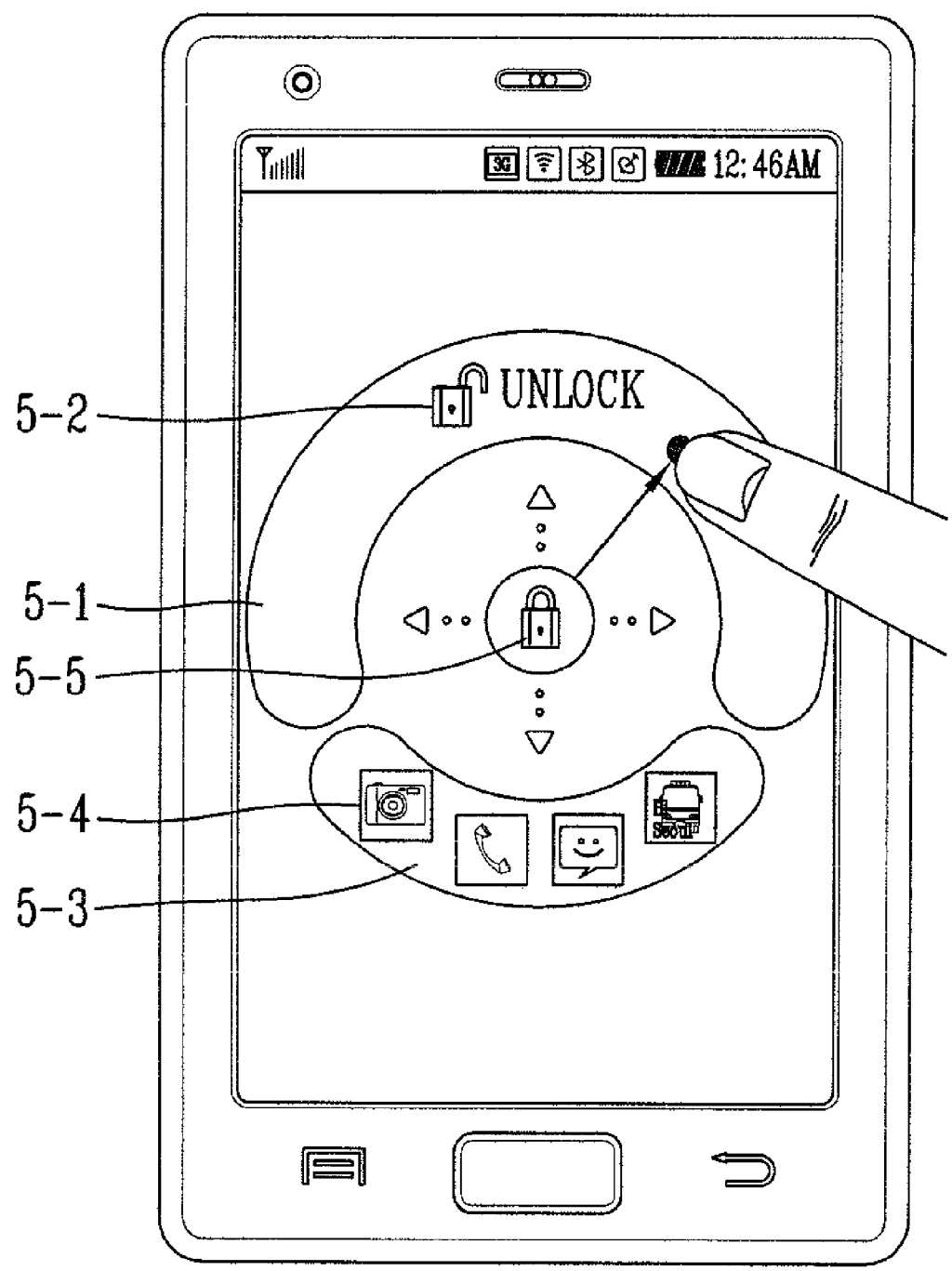
FIG. 6 is a diagram illustrating a method for unlocking a touch screen in accordance with the first embodiment of the present invention.

FIG. 6 is a diagram illustrating a method for unlocking a touch screen in accordance with the first embodiment of the present invention.

As shown in FIG. 6, the controller 401 determines whether the user has located the first icon 5-5 in the first region 5-1 through drag and drop.

The controller 401 automatically unlocks the touch screen when the first icon 5-5 is located in the first region 5-1 (S16). For example, the controller 401 unlocks the touch screen through drag and drop of the user when the first icon 5-5 is located in the first region 5-1.

The controller 401 may display a window requesting a password in the display module 402 when the first icon is located in the first region, and may display a desktop image in the display module 402 when the password is input.

Figure 7:
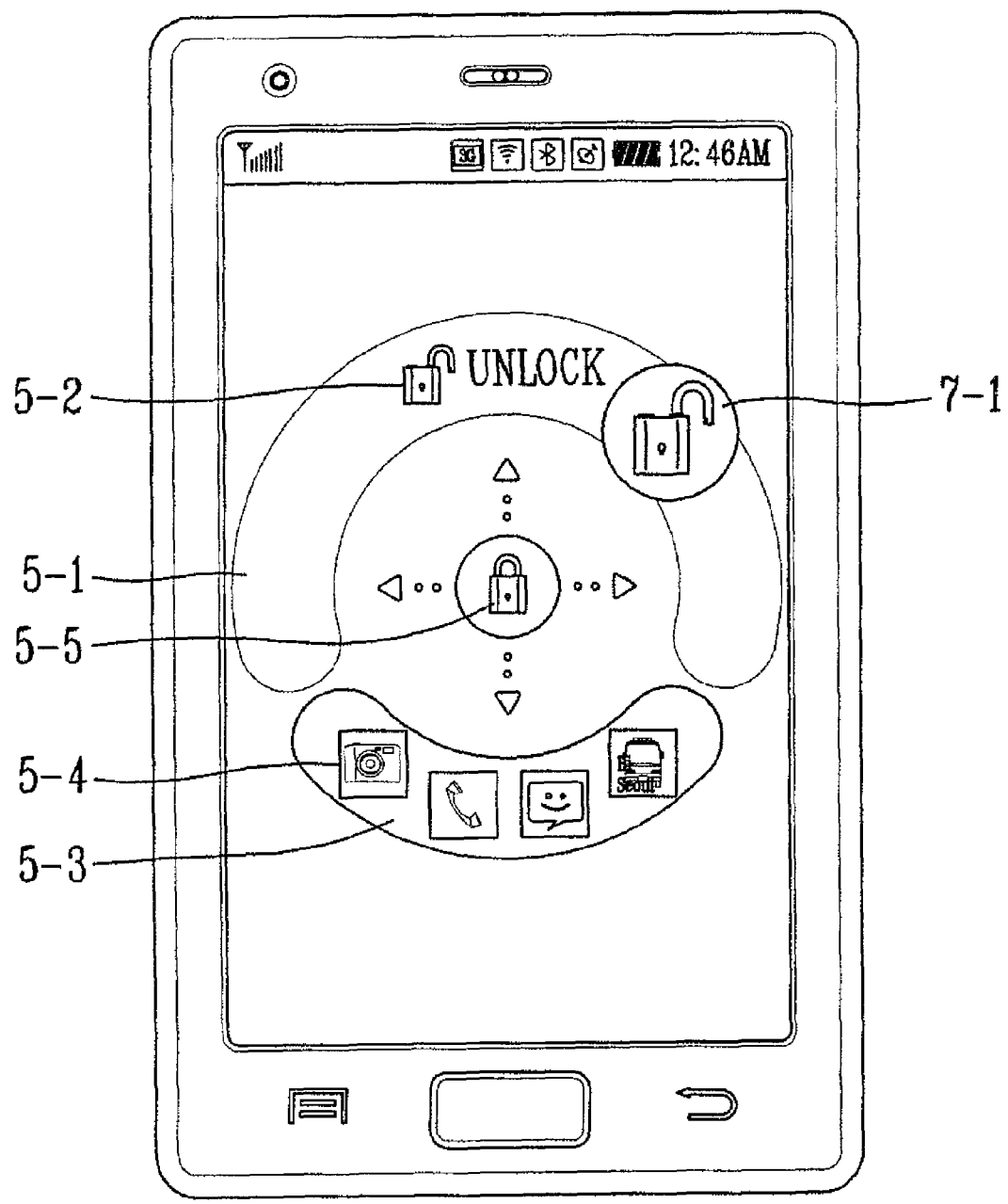
FIG. 7 is a diagram illustrating an icon indicating that a touch screen has been unlocked in accordance with the first embodiment of the present invention.

FIG. 7 is a diagram illustrating an icon representing that a touch screen has been unlocked in accordance with the first embodiment of the present invention.

As shown in FIG. 7, the controller 401 displays a second icon 7-1, which indicates that the touch screen has been unlocked, in the first region 5-1 when the first icon 5-5 is located in the first region 5-1.

Therefore, in the information display device and the method for the same according to the first embodiment of the present invention, the first icon (execution cursor) indicating the locking state of the touch screen, the first region for releasing the locking state of the touch screen, and the second region indicating icon(s) linked to the application program may be displayed on the touch screen locking screen, whereby the touch screen may be unlocked quickly and effectively and at the same time the icon linked to the application program described by the user may be identified on the touch screen locking screen.

Hereinafter, an information display device and a method for the same according to the second embodiment of the present invention will be described with reference to FIG. 3, and FIG. 8 and FIG. 9. The information display device and the method for the same according to the second embodiment of the present invention may be applied to a smart phone, a notebook computer, a digital broadcast terminal, PDA (personal digital assistants), a PMP (portable multimedia player), a desktop computer, a television, and various moving picture players as well as the mobile communication terminal 100, the telematics mobile terminal 200, and a video conference terminal.

Figure 8:
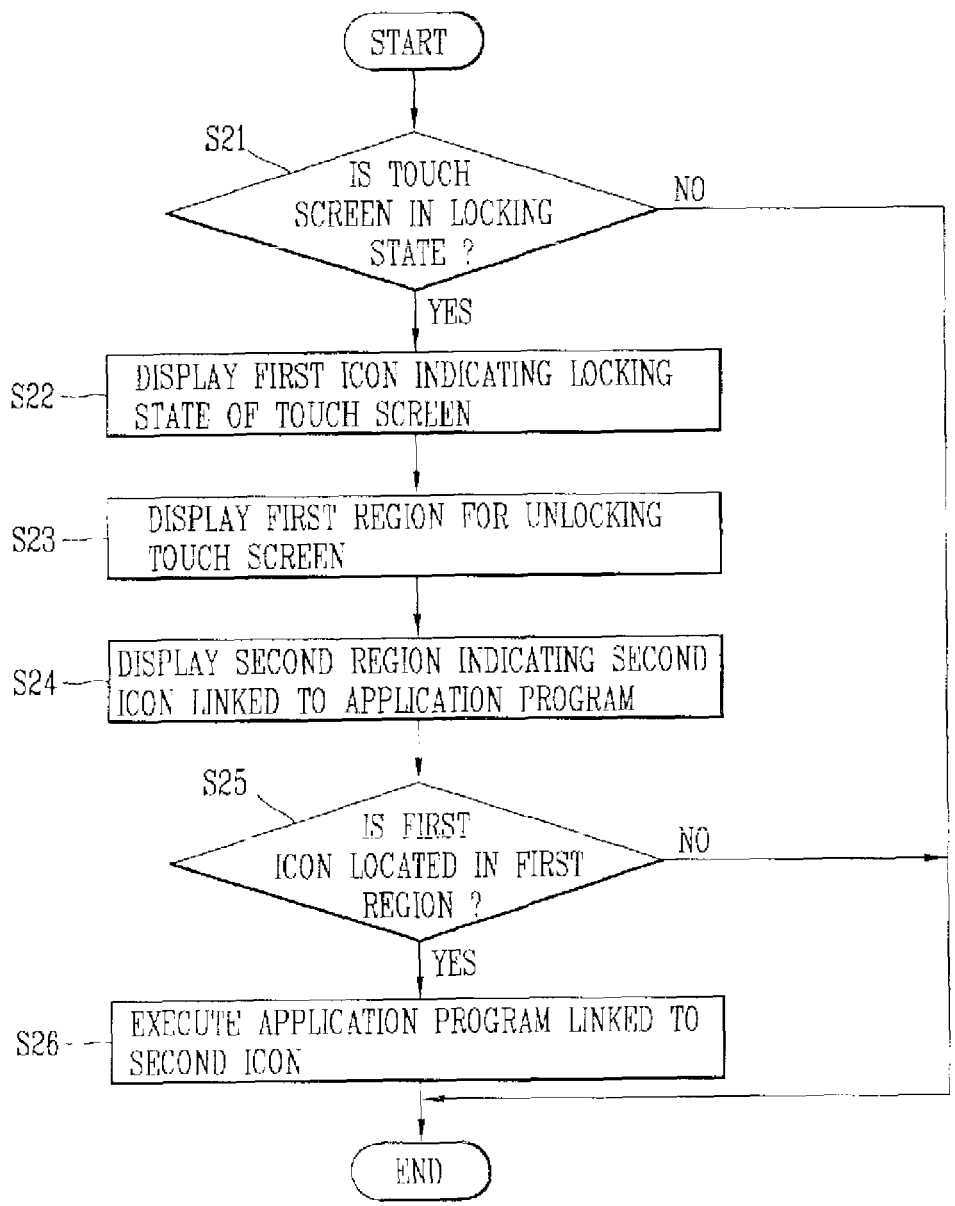
FIG. 8 is a flow chart illustrating a method for displaying information according to the second embodiment of the present invention.

FIG. 8 is a flow chart illustrating a method for displaying information according to the second embodiment of the present invention.

First of all, the controller 401 determines whether the touch screen of the display module 402 (or touch screen display module) is in a locking state (touch screen locking mode) (S21).

The controller 401 displays the touch screen locking screen in the display module 402 when the touch screen of the display module 402 (or touch screen display module) is in a locking state (touch screen locking mode).

The controller 401 generates a first icon (execution cursor) indicating the locking state of the touch screen and displays the generated first icon on the touch screen locking screen (S22).

The controller 401 displays a first region for unlocking the touch screen on the touch screen locking screen (S23).

The controller 401 displays a second region indicating icon(s) linked to an application program on the touch screen locking screen (S24). The controller 401 may simultaneously display the first icon, the first region and the second region on the touch screen locking screen when the touch screen is in a locking state.

The controller 401 may display an icon 5-2, which indicates that the touch screen could be unlocked, on the first region 5-1. The controller 401 may display icon(s) 5-4 linked to the application program on the second region 5-3. Each of the first region (or first execution region) 5-1 and the second region (or second execution region) 5-3 may be a curved line having a rim. The first region (or first execution region) 5-1 and the second region (or second execution region) 5-3 may be two regions 5-1 and 5-3 (two separate circles each having a rim) generated by separating one circle having a rim into two. The controller 401 may control the first icon 5-5 to be shifted within the first region 5-1 and the second region 5-3 only.

The application program may be downloaded from a server (not shown) by the user. The application program may be a variety of application programs, such as a game program, an entertainment program, an educational program, a message management program, a calendar management program, a moving picture execution program, a photo display program, a weather information providing program, and the like, and those programs are stored in the memory 403.

The controller 401 may activate the first icon, the first region and the second region when the touch screen of the display module 402 is in a locking state, display an icon indicating unlocking of the touch screen in the first region, and display at least one or combination of icon(s) linked to an application program previously set by the user, icon(s) linked to an application program automatically set in accordance with use frequency, and icon(s) linked to an application program recently used, in the second region.

The controller 401 determines whether the first icon 5-5 has been located in a specific icon (second icon) displayed in the second region 5-3 (S25).

Figure 9:
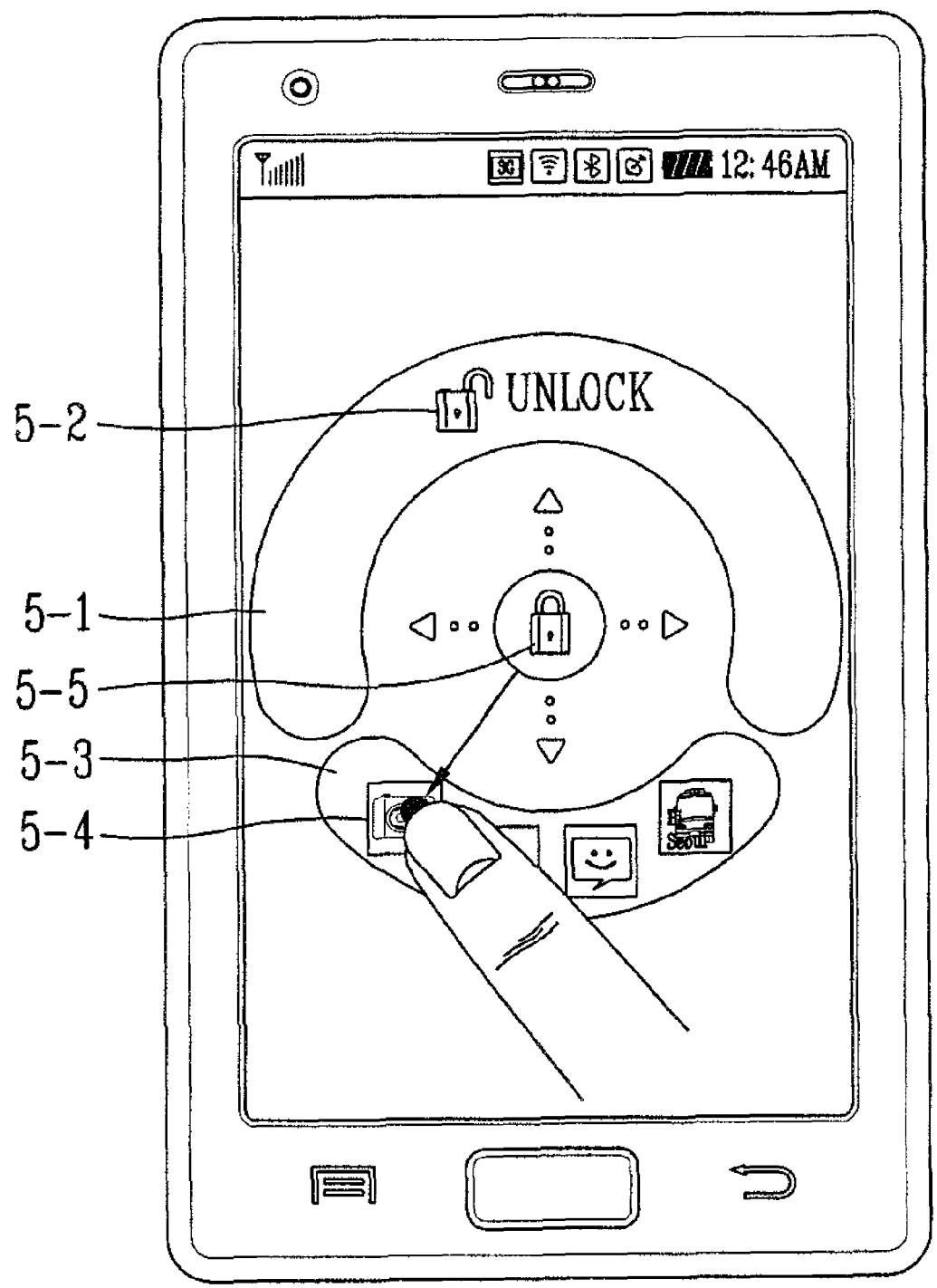
FIG. 9 is a flow chart illustrating a method for executing an application program displayed on a touch screen locking screen in accordance with the second embodiment of the present invention.

FIG. 9 is a flow chart illustrating a method for executing an application program displayed on a touch screen locking screen in accordance with the second embodiment of the present invention.

As shown in FIG. 9, the controller 401 determines whether the user has located the first icon 5-5 in the second icon 5-4 displayed in the second region 5-3 through drag and drop. When the user has located the first icon 5-5 in the second region 5-3 through drag and drop, the controller 401 may execute application programs linked to all the icons displayed in the second region 5-3.

The controller 401 executes the application program (for example, application program for image photographing) linked to the second icon 5-4 when the first icon 5-5 is located in the second icon 5-4 displayed in the second region 5-3 (S26). For example, the controller 401 executes the application program linked to the second icon 5-4 by automatically unlocking the touch screen when the first icon 5-5 is located in the second icon 5-4 displayed in the second region 5-3.

The controller 401 may display a window requesting a password in the display module 402 when the first icon 5-5 is located in the second region 5-3 or the second icon 5-4, and may display a desktop image in the display module 402 when the password is input.

The controller 401 may differently set resolution of touch sensitivity of the touch sensor 402-1 through drag and drop of the user when the first icon 5-5 is shifted to the first region 5-1 and when the first icon 5-5 is shifted to the second region 5-3. For example, the controller 401 sets resolution of touch sensitivity of the touch sensor 402-1 to be equal to or lower than a reference threshold value when the first icon 5-5 is shifted to the first region 5-1. On the other hand, the controller 401 may set resolution of touch sensitivity of the touch sensor 402-1 to be higher than the reference threshold value when the first icon 5-5 is shifted to the second region 5-3, thereby increasing touch sensitivity of the second icon 5-4 displayed in the second region 5-3. Resolution of touch sensitivity of the touch sensor 402-1 may be set by the user.

Therefore, in the information display device and the method for the same according to the second embodiment of the present invention, when the first icon (execution cursor) indicating the locking state of the touch screen is located in the second icon linked to the application program displayed on the touch screen locking screen, the application program linked to the second icon is executed, whereby the corresponding application program may be executed quickly and effectively.

Hereinafter, an information display device and a method for the same according to the third embodiment of the present invention will be described with reference to FIG. 3, and FIG. 10 and FIG. 11. The information display device and the method for the same according to the third embodiment of the present invention may be applied to a smart phone, a notebook computer, a digital broadcast terminal, PDA (personal digital assistants), a PMP (portable multimedia player), a desktop computer, a television, and various moving picture players as well as the mobile communication terminal 100, the telematics mobile terminal 200, and a video conference terminal.

Figure 10:
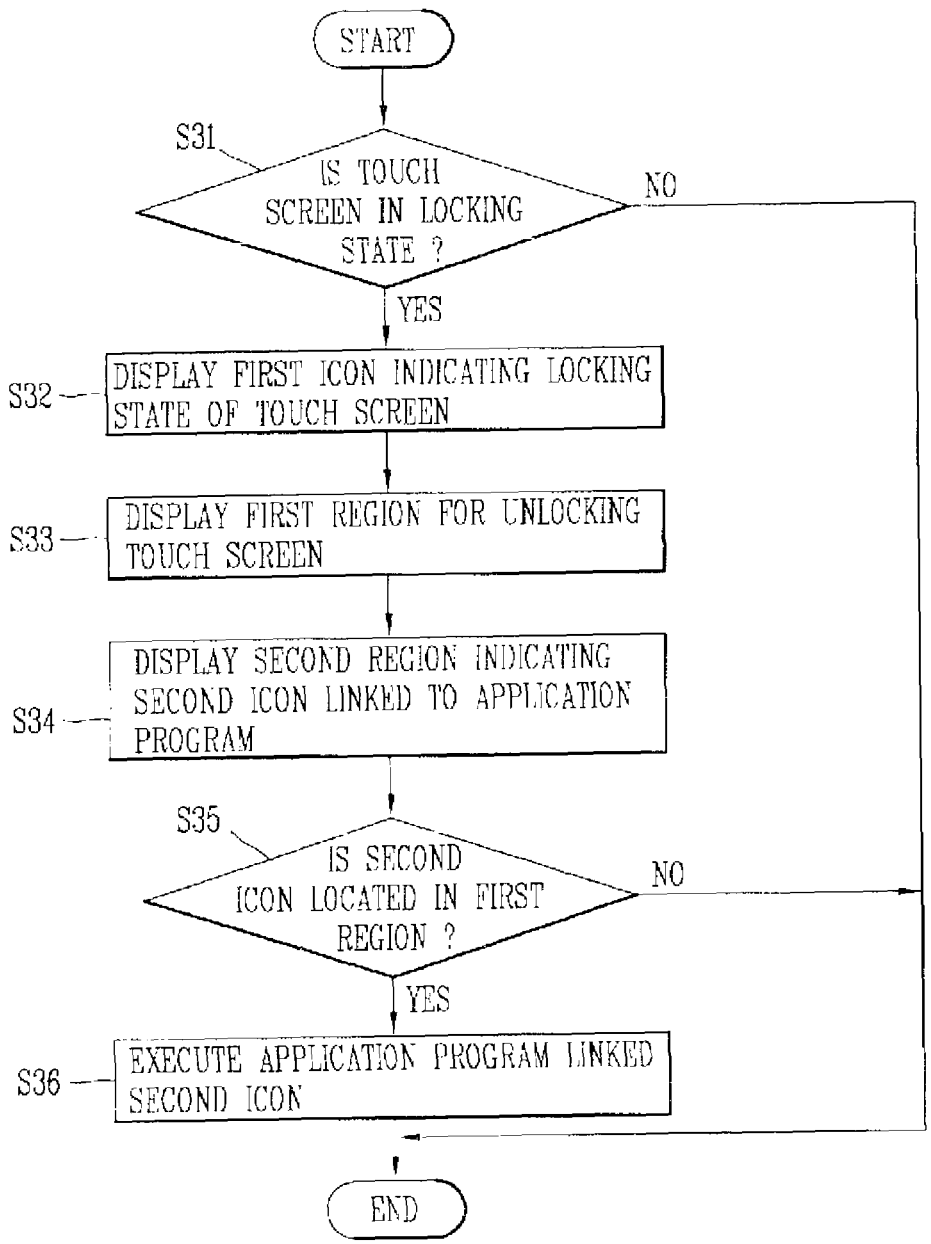
FIG. 10 is a flow chart illustrating a method for displaying information according to the third embodiment of the present invention.

FIG. 10 is a flow chart illustrating a method for displaying information according to the third embodiment of the present invention.

First of all, the controller 401 determines whether the touch screen of the display module 402 (or touch screen display module) is in a locking state (touch screen locking mode) (S31).

The controller 401 displays the touch screen locking screen in the display module 402 when the touch screen of the display module 402 (or touch screen display module) is in a locking state (touch screen locking mode).

The controller 401 generates a first icon (execution cursor) indicating the locking state of the touch screen and displays the generated first icon on the touch screen locking screen (S32).

The controller 401 displays a first region for unlocking the touch screen on the touch screen locking screen (S33).

The controller 401 displays a second region indicating icon(s) linked to an application program on the touch screen locking screen (S34). The controller 401 may simultaneously display the first icon, the first region and the second region on the touch screen locking screen when the touch screen is in a locking state.

The controller 401 may display an icon 5-2, which indicates that the touch screen could be unlocked, on the first region 5-1. The controller 401 may display icon(s) 5-4 linked to the application program on the second region 5-3. Each of the first region (or first execution region) 5-1 and the second region (or second execution region) 5-3 may be a curved line having a rim. The first region (or first execution region) 5-1 and the second region (or second execution region) 5-3 may be two regions 5-1 and 5-3 (two separate circles each having a rim) generated by separating one circle having a rim into two. The controller 401 may control the first icon 5-5 to be shifted within the first region 5-1 and the second region 5-3 only.

The application program may be downloaded from a server (not shown) by the user. The application program may be a variety of application programs, such as a game program, an entertainment program, an educational program, a message management program, a calendar management program, a moving picture execution program, a photo display program, a weather information providing program, and the like, and those programs are stored in the memory 403.

The controller 401 may activate the first icon, the first region and the second region when the touch screen of the display module 402 is in a locking state, display an icon indicating unlocking of the touch screen in the first region, and display at least one or combination of icon(s) linked to an application program previously set by the user, icon(s) linked to an application program automatically set in accordance with use frequency, and icon(s) linked to an application program recently used, in the second region.

The controller 401 determines whether the second icon 5-4 displayed in the above region has been located in the first region 5-1 (S35).

Figure 11:
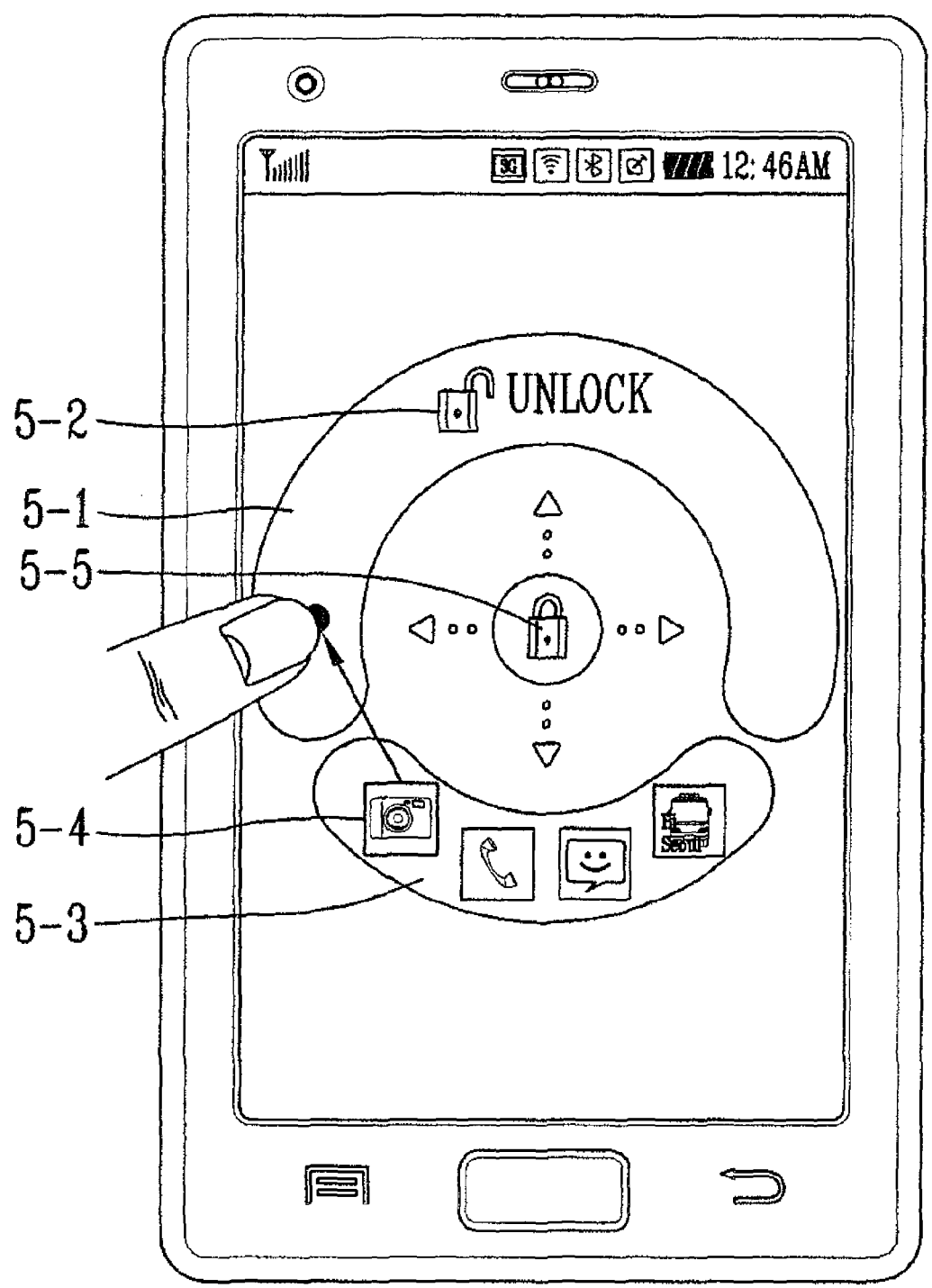
FIG. 11 is a flow chart illustrating a method for executing an application program displayed on a touch screen locking screen in accordance with the third embodiment of the present invention.

FIG. 11 is a flow chart illustrating a method for executing an application program displayed on a touch screen locking screen in accordance with the third embodiment of the present invention.

As shown in FIG. 11, the controller 401 determines whether the user has located the second icon 5-4 in the first region 5-1 through drag and drop. When the user has located the second icon 5-4 in the first region 5-1 through drag and drop, the controller 401 may execute application programs linked to all the icons displayed in the second region 5-3.

The controller 401 executes the application program (for example, application program for image photographing) linked to the second icon 5-4 when the second icon 5-4 is located in the first region 5-1 (S36). For example, the controller 401 executes the application program linked to the second icon 5-4 by automatically unlocking the touch screen when the second icon 5-4 is located in the first region 5-1.

The controller 401 may display a window requesting a password in the display module 402 when the second icon 5-4 is located in the first region 5-1, and may display a desktop image in the display module 402 when the password is input.

Therefore, in the information display device and the method for the same according to the third embodiment of the present invention, when the second icon linked to the application program displayed on the touch screen locking screen is located in the region for unlocking the touch screen, the application program linked to the second icon is executed, whereby the corresponding application program may be executed quickly and effectively.

Hereinafter, an information display device and a method for the same according to the fourth embodiment of the present invention will be described with reference to FIG. 3, and FIG. 12 and FIG. 13. The information display device and the method for the same according to the fourth embodiment of the present invention may be applied to a smart phone, a notebook computer, a digital broadcast terminal, PDA (personal digital assistants), a PMP (portable multimedia player), a desktop computer, a television, and various moving picture players as well as the mobile communication terminal 100, the telematics mobile terminal 200, and a video conference terminal.

Figure 12:
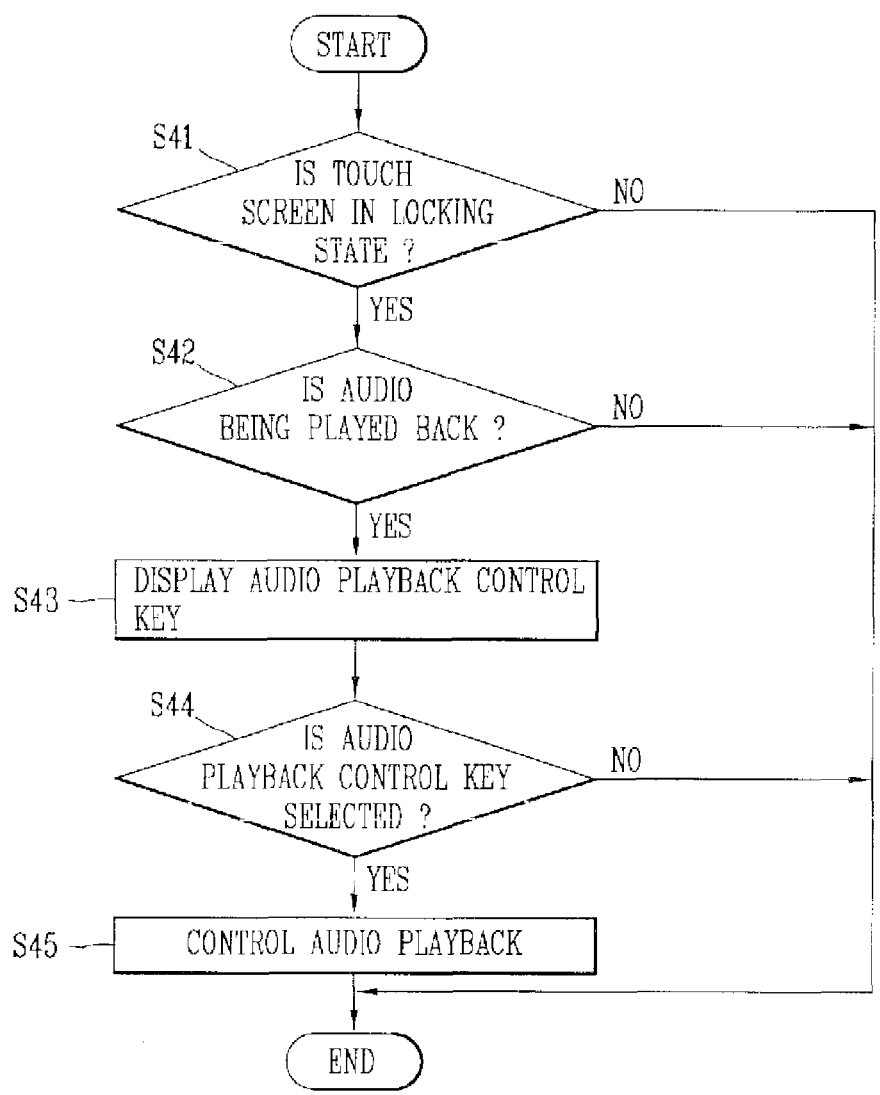
FIG. 12 is a flow chart illustrating a method for displaying information according to the fourth embodiment of the present invention.

FIG. 12 is a flow chart illustrating a method for displaying information according to the fourth embodiment of the present invention.

First of all, the controller 401 determines whether the touch screen of the display module 402 (or touch screen display module) is in a locking state (touch screen locking mode) (S41).

If the touch screen of the display module 402 is in the locking state, the controller 401 determines whether audio (music or music video) is being played back through an audio playback application program (S42). In this case, the controller 401 locks the touch screen if a certain time passes while music is being played back or if a power button is selected by the user. However, the controller still plays back music even though the touch screen is locked.

The controller 401 displays key(s) (audio playback control key) for controlling audio playback in the display module 402 if audio is being played back in a state that the touch screen of the display module 402 is locked (S43). For example, if music is being played back in a state that the touch screen of the display module 402 (or touch screen display module) is locked, the controller 401 displays a key (for example, play key, stop key, fast forward (FF) key, fast rewinding (FR) key, etc.) for controlling music playback on the touch screen locking screen of the display module 402. The controller 401 may further display a time bar indicating audio (music) playback time, a representative image (for example, thumbnail image of music file) of audio data, and audio data information (for example, music title, singer name, etc.).

Figure 13:
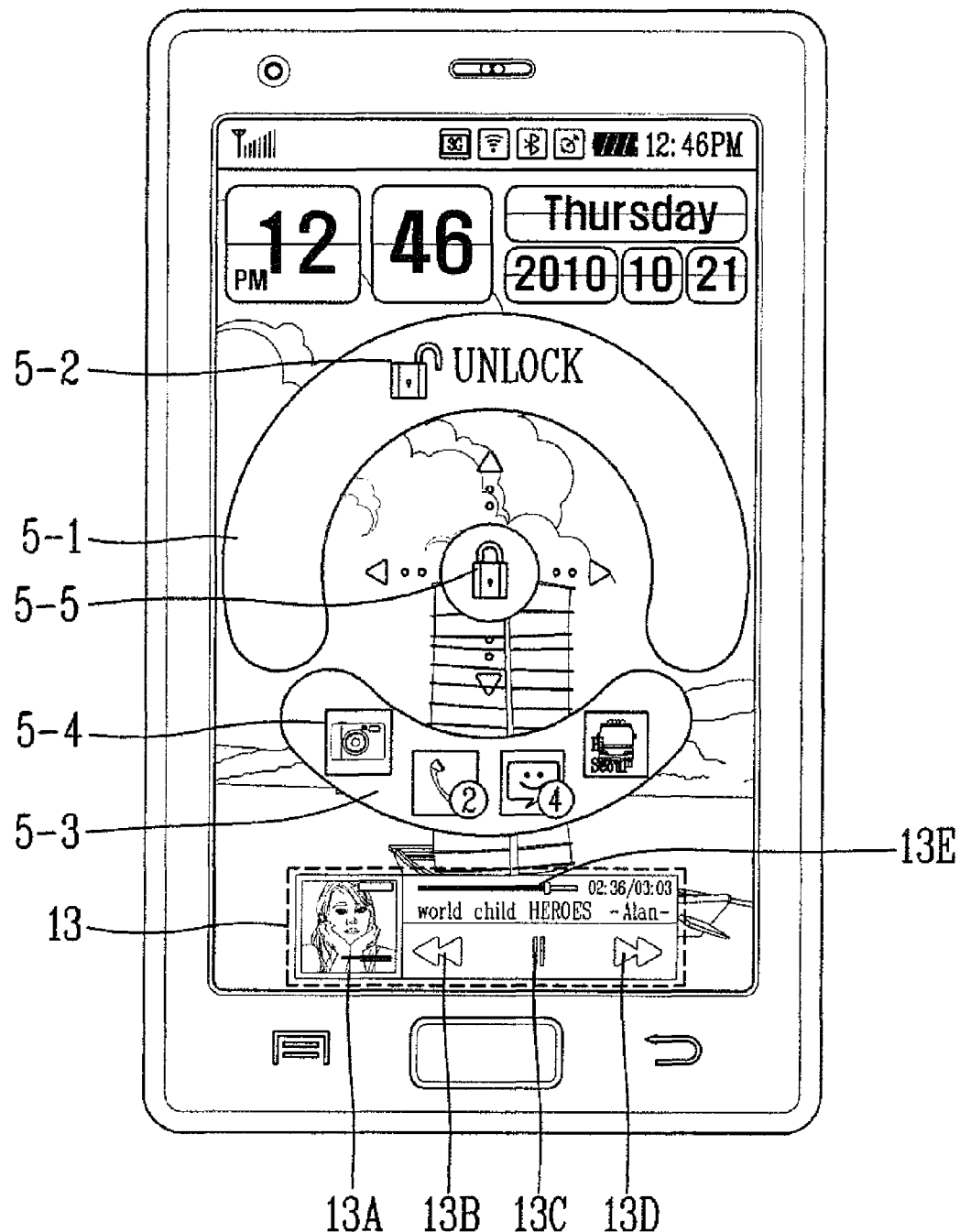
FIG. 13 is an exemplary view illustrating an audio playback control key displayed in a display module when a touch screen of the display module is locked in accordance with the fourth embodiment of the present invention.

FIG. 13 is an exemplary view illustrating an audio playback control key displayed in the display module when the touch screen of the display module is locked in accordance with the fourth embodiment of the present invention.

As shown in FIG. 13, if music is being played back in a state that the touch screen of the display module 402 is locked, the controller 401 displays a key 13 (for example, play key, stop key 13C, fast forward (FF) key 13D, fast rewinding (FR) key 13B, etc.) for controlling music playback on the touch screen locking screen. The controller 401 may further display a time bar indicating audio (music) playback time, a representative image 13A (for example, thumbnail image of music file) of audio data, and audio data information 13E (for example, music title, singer name, etc.) on the touch screen locking screen.

When the touch screen of the display module 402 is in the locking state and audio is being played back, the controller 401 determines whether the audio playback control key displayed in the display module 402 has been selected by the user (S44).

In a state that the touch screen is in the locking state, if the audio playback control key displayed in the display module 402 is selected by the user, the controller 401 controls audio playback in accordance with the selected key (S45).

Therefore, in the information display device and the method for the same according to the fourth embodiment of the present invention, when the touch screen of the display module 402 is in the locking state and music is being played back, the key (button) for controlling music playback is displayed on the touch screen of the locking state, whereby the user may control music playback easily and quickly.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

As described above, in the information display device and the method for the same according to the embodiments of the present invention, the touch screen can be unlocked quickly and effectively when the touch screen is locked.

Also, when the icon displayed on the touch screen locking screen is located in the unlocking region, the application program linked to the icon can be executed quickly and effectively.

Moreover, in a state that the touch screen of the display module is in the locking state, when music is being played back, the key (button) for controlling music playback is displayed on the touch screen of the locking state, whereby the user can control music playback easily and quickly.

The invention claimed is:

1. A method of controlling an information display device having a touch screen, the method comprising:
   outputting audible data while the touch screen is in an unlocked state and while an audio playback application is performed;
   causing the touch screen to enter a locked state when a certain period of time lapses while the audio playback application is being performed in the unlocked state;
   continuing to perform the audio playback application such that the audible data is continuously output when the touch screen enters the locked state;
   displaying, in the locked state, an image for unlocking the touch screen, at least one application icon, and a virtual key for controlling the audio playback application on the touch screen together when the audible data is being output; and
   operating different functions based on whether a first drag input is applied to the at least one application icon, a second drag input is applied to the touch screen, or a touch input is applied to the virtual key, wherein the first drag input, the second drag input, and the touch input are applied while the image for unlocking the touch screen, the at least one application icon, and the virtual key are displayed,
   wherein the at least one application icon is linked to at least one application program stored in a memory of the information display device, the at least one application icon being different from the image for unlocking the touch screen,
   wherein a first function related to the first drag input is performed to display an execution screen of the at least one application program in response to a release of the first drag input from the touch screen,
   wherein a second function related to the touch input is performed in response to the touch input to control the output of the audible data while the locked state is maintained, and
   wherein a third function related to the second drag input is performed to display a window requesting an input of a password for unlocking the touch screen that is in the locked state in response to the second drag input.

2. The method of claim 1, further comprising unlocking the touch screen in response to the release of the first drag input such that the execution screen is displayed in the unlocked state.

3. The method of claim 2, wherein the at least one application icon moves by the first drag input, and
   wherein the at least one application icon drops for unlocking by the release of the first drag input.

4. The method of claim 1, wherein the virtual key comprises at least one of a play key, a stop key, a fast forward key, or a fast rewinding key for receiving the touch input.

5. The method of claim 1, further comprising displaying at least one of a time bar indicating an audio playback time, a representative image of audio data, or audio data information in the locked state.

6. A method of controlling an information display device having a touch screen, the method comprising:
   outputting audible data while the touch screen is in an unlocked state and while an audio playback application is performed;
   causing the touch screen to enter a locked state when a certain period of time lapses while the audio playback application is being performed in the unlocked state;
   continuing to perform the audio playback application such that the audible data is continuously output when the touch screen enters the locked state;
   displaying, in the locked state, an image for unlocking the touch screen, at least one application icon, and a virtual key for controlling the audio playback application on the touch screen together when the audible data is being output; and
   operating different functions based on whether a first drag input is applied to the at least one application icon, a second drag input is applied to the touch screen, or a touch input is applied to the virtual key, wherein the first drag input, the second drag input, and the touch input are applied while the image for unlocking the touch screen, the at least one application icon, and the virtual key are displayed,
   wherein the at least one application icon is linked to at least one application program stored in a memory of the information display device, the at least one application icon being different from the image for unlocking the touch screen,
   wherein a first function related to the first drag input is performed to display an execution screen of the at least one application program in response to a release of the first drag input from the image for unlocking,
   wherein a second function related to the touch input is performed in response to the touch input to control the output of the audible data while the locked state is maintained, and
   wherein a third function related to the second drag input is performed to display a window requesting an input of a password for unlocking the touch screen that is in the locked state in response to the second drag input.

7. The method of claim 6, further comprising unlocking the touch screen in response to the release of the first drag input.

8. The method of claim 7, wherein the at least one application icon moves by the first drag input, and
   wherein the at least one application icon drops on the image for unlocking by the release of the first drag input.

9. The method of claim 6, wherein the at least one application icon is one of a plurality of displayed application icons, and
   wherein the plurality of displayed application icons are set by a user or are set in accordance with use frequency.

10. The method of claim 9, wherein the at least one application program is downloaded from a server.

11. The method of claim 6, wherein the virtual key comprises at least one of a play key, a stop key, a fast forward key, or a fast rewinding key for receiving the touch input.

12. The method of claim 11, further comprising displaying at least one of a time bar indicating an audio playback time, a representative image of audio data, or audio data information in the locked state.

13. An information display device, comprising:
   a memory;
   a touch screen configured to display visual information;
   an audio output unit; and
   a controller:
      causing the audio output unit to output audible data while the touch screen is in an unlocked state and while an audio playback application is performed;

causing the touch screen to enter a locked state when a certain period of time lapses while the audio playback application is being performed in the unlocked state;

continuing to perform the audio playback application such that the audible data is continuously output when the touch screen enters the locked state;

causing the touch screen to display, in the locked state, an image for unlocking the touch screen, at least one application icon, and a virtual key for controlling the audio playback application together when the audible data is being output; and operating different functions based on whether a first drag input is applied to the at least one application icon, a second drag input is applied to the touch screen, or a touch input is applied to the virtual key, wherein the first drag input, the second drag input, and the touch input are applied while the image for unlocking the touch screen, the at least one application icon, and the virtual key are displayed, wherein the at least one application icon is linked to at least one application program stored in the memory, the at least one application icon being different from the image for unlocking the touch screen, wherein a first function related to the first drag input is performed to display an execution screen of the at least one application program in response to a release of the first drag input from the touch screen, and wherein a second function related to the touch input is performed in response to the touch input to control the output of the audible data while the locked state is maintained and wherein a third function related to the second drag input is performed to display a window requesting an input of a password for unlocking the touch screen that is in the locked state in response to the second drag input.

14. The information display device of claim 13, wherein the touch screen is unlocked in response to the release of the first drag input such that the execution screen is displayed in the unlocked state.

15. The information display device of claim 14, wherein the at least one application icon moves by the first drag input, and wherein the at least one application icon drops for unlocking by the release of the first drag input.

16. An information display device, comprising:
a memory;
a touch screen configured to display visual information;
an audio output unit; and
a controller:
 causing the audio output unit to output audible data while the touch screen is in an unlocked state and while an audio playback application is performed;
 causing the touch screen to enter a locked state when a certain period of time lapses while the audio playback application is being performed in the unlocked state;
 continuing to perform the audio playback application such that the audible data is continuously output when the touch screen enters the locked state;
 causing the touch screen to display, in the locked state, an image for unlocking the touch screen, at least one application icon, and a virtual key for controlling the audio playback application together when the audible data is being output; and
 operating different functions based on whether a first drag input is applied to the at least one application icon, a second drag input is applied to the touch screen, or a touch input is applied to the virtual key, wherein the first drag input, the second drag input, and the touch input are applied while the image for unlocking the touch screen, the at least one application icon, and the virtual key are displayed,
wherein the at least one application icon is linked to at least one application program stored in a memory of the information display device, the at least one application icon being different from the image for unlocking the touch screen,
wherein a first function related to the first drag input is performed to display an execution screen of the at least one application program in response to a release of the first drag input from the image for unlocking, and
wherein a second function related to the touch input is performed in response to the touch input to control the output of the audible data while the locked state is maintained, and
wherein a third function related to the second drag input is performed to display a window requesting an input of a password for unlocking the touch screen that is in the locked state in response to the second drag input.

* * * * *